United States Patent
Olsen et al.

(10) Patent No.: US 6,519,642 B1
(45) Date of Patent: Feb. 11, 2003

(54) SYSTEM AND METHOD FOR CREATING, EXECUTING AND MAINTAINING CROSS-ENTERPRISE PROCESSES

(75) Inventors: Gregory R. Olsen, Belmont, CA (US); Hildreth R. Frost, San Francisco, CA (US); Chelliah Thirunavukkarasu, Belmont, CA (US); Mitchell W. Nibbelink, Redwood City, CA (US)

(73) Assignee: Peregrine Force, Inc., San Diego, CA (US)

( * ) Notice: Subject to any disclaimer, the term of this patent is extended or adjusted under 35 U.S.C. 154(b) by 0 days.

(21) Appl. No.: 09/142,844

(22) PCT Filed: Jan. 23, 1998

(86) PCT No.: PCT/US98/01403
§ 371 (c)(1),
(2), (4) Date: Sep. 15, 1998

(87) PCT Pub. No.: WO98/33125
PCT Pub. Date: Jul. 30, 1998

Related U.S. Application Data

(60) Provisional application No. 60/036,385, filed on Jan. 24, 1997.

(51) Int. Cl.[7] ............................................... G06F 15/16
(52) U.S. Cl. ........................ 709/227; 709/228; 709/205
(58) Field of Search ................................ 709/203, 227, 709/228, 229, 101, 311, 313, 318, 204, 205, 237; 705/7, 21, 22, 26, 28, 29, 64, 70; 455/411

(56) References Cited

U.S. PATENT DOCUMENTS 4,993,014 A * 2/1991 Gordon ....................... 370/225
5,355,365 A * 10/1994 Bhat et al. ................... 370/401

(List continued on next page.)

FOREIGN PATENT DOCUMENTS

DE 196 29 192 A1 7/1996 ............. H04L/9/00
GB 2 271 002 A 3/1994 ........... G06F/15/21

OTHER PUBLICATIONS

Fitzgerald, A., "Enterprise resource planning (ERP)—breakthrough or buzzword", IEEE 3rd Inter. Conf. on Competitive Performance Through a Technology, ISBN: 0–85296–548–6, pp. 291–297, 1992.*

(List continued on next page.)

Primary Examiner—Zarni Maung
Assistant Examiner—Jason D. Cardone
(74) Attorney, Agent, or Firm—Fenwick & West LLP

(57) ABSTRACT

A system and method for creating, executing, and maintaining shared, automated business processes across distributed organizations comprises capabilities that enable interoperation among heterogeneous information systems. The system includes a plurality of independent communicating subsystems called sites that have a server with common means of representing and executing shared public process definitions and private process definitions. Process execution comprises coordinated inter-site message exchanges that are coupled with controlled sequences of actions that are local to each of the sites. The public process definition or module captures interactions among the independent sites. Interactions include communication events in which one site sends a message of a known type to another site. Each definition specifies a set of valid sequences of communication events among the participating sites. Associated with any public process definition is a set of lower level or private process definitions or modules. The private process definition specifies a set of possible local actions that can be executed at the site when that particular public process node is executed. In the preferred embodiment, the private process definition is defined in terms of constructs such as operating parameters and software application interactions.

10 Claims, 9 Drawing Sheets

U.S. PATENT DOCUMENTS

| | | | | |
|---|---|---|---|---|
| 5,390,247 A | * | 2/1995 | Fischer | 713/176 |
| 5,557,780 A | * | 9/1996 | Edwards et al. | 703/27 |
| 5,689,642 A | * | 11/1997 | Harkins et al. | 709/207 |
| 5,778,178 A | * | 7/1998 | Arunachalam | 709/203 |
| 5,812,669 A | | 9/1998 | Jenkins et al. | 380/25 |
| 5,815,665 A | * | 9/1998 | Teper et al. | 709/229 |
| 5,818,921 A | * | 10/1998 | Vander Meiden et al. | 379/225 |
| 5,864,667 A | * | 1/1999 | Barkan | 713/201 |
| 6,009,458 A | * | 12/1999 | Hawkins et al. | 709/203 |
| 6,052,711 A | * | 4/2000 | Gish | 709/203 |
| 6,055,575 A | * | 4/2000 | Paulson et al. | 709/229 |
| 6,058,250 A | * | 5/2000 | Harwood et al. | 709/227 |
| 6,072,870 A | * | 6/2000 | Nguyen et al. | 705/79 |
| 6,088,717 A | * | 7/2000 | Reed et al. | 709/201 |
| 6,101,543 A | * | 8/2000 | Alden et al. | 709/229 |

OTHER PUBLICATIONS

Adhikari, Richard, "The ERP–To–ERP Connection", InformationWEEK, pp. 1–2, Oct. 1998.*

Merrill, D.C. et al., "Requirements for a true enterprise–wide security infrastructure: the play's the thing", IEEE Symp. on Reliable Distributed Systems, ISBN: 0–8186–9218–9, pp. 403–406, Oct. 1998.*

Workflow Management Coalition members, "Workflow Management Coalition Workflow Standard—Interoperability Abstract Specification" (Doc. No. WFMC–TC–1012) Oct. 20, 1996.

"NTT R&D" vol. 45, No. 12 (Dec., 1996) pp. 91–104.

Rick Telecom, "Network Computing" vol. 8, No. 10.

* cited by examiner

SYSTEM AND METHOD FOR CREATING, EXECUTING AND MAINTAINING CROSS-ENTERPRISE PROCESSES

This application claims the benefit of provisional application No. 60/036,385, filed Jan. 24, 1997.

BACKGROUND OF THE INVENTION

1. Field of the Invention

The present invention relates generally to information systems, and in particular to a system and methods that enable the coordination of activity among distributed information systems.

2. Description of the Related Art

The recent change in the structure of business organizations, from the independent monolithic entity to multiple interdependent businesses, mirrors a similar evolution in computer systems from the single mainframe to distributed networks of personal computers and workstations. Since computer networks are extremely efficient in communicating information and performing activities between distributed sites, modem networks should be the obvious beneficiaries of this revolution in technology. For example, such routine activities as ordering and confirming purchases could be performed automatically between existing systems by a shared computer network. Numerous shortcomings in the state of the art, however, prevent full exploitation of conventional network technology for inter-enterprise purposes.

The most pressing problems presented by the use of shared networks between business partners are (1) the heterogeneity of the partner computer systems, (2) the heterogeneity of the data used by the partner systems, (3) communication security and reliability between systems, and (4) the legal, organizational and cultural boundaries among partners.

With respect to system heterogeneity, organizations often use combinations of operating systems, middleware systems, and software applications that are incompatible with one another. Widespread middleware deployment is now underway, but interoperation among the leading camps has yet to be fully defined. Especially problematic are differences at the application level, which are fundamental and will continue to challenge implementers for some time.

With respect to the second problem, data heterogeneity, different applications and users of those applications often represent information in different ways or use different kinds of information to accomplish the same task. These gaps can be particularly significant when the applications and their users are distributed among different enterprises. Bridging the associated syntactic and semantic gaps in information can require a mixture of transformation capabilities as well as neutral objects.

With respect to the third problem, communication security and reliability, any interaction among the systems of a business network requires the presence of reliable and secure communication pathways between the participants. The concern for security is especially prominent when the Internet is used as a link in the communication pathway, since this medium is susceptible to eavesdropping and other forms of security attacks.

With respect to the fourth problem, any attempt to automate business processes between multiple partners must overcome the numerous non-technical barriers associated with management of a project distributed among multiple organizations. These challenges include mismatches between project priority and resource allocation, language barriers, time zone differences and both corporate and governmental regulations. These challenges limit the levels of coordination that are achievable. Any technical solution, therefore, must focus on minimizing the scope and complexity of the mutual commitments required to implement the solution.

Currently, there are at least five known methods for extending interdependent processes beyond one computer system to other systems connected by conventional computer networking resources. The first is the manual approach in which users of multiple computer systems communicate information between one another via telephone, fax, or other media. The communicated information is then entered by hand into the respective computer systems. The manual approach may be used to bridge gaps in automation, but is obviously limited in its ability to tightly couple processes among partners in both reliable and efficient manner.

The second approach, which arose in the era of home-grown mainframe applications, is known as Electronic Data Interchange (EDI). EDI is a broadly defined term, but most often refers to a particular set of standards, technologies (Value-Added Networks, Direct Dial-ups, mapping software), and practices used for electronic data exchange among companies. In EDI, a collection of business information (e.g., a purchase order) may be exported from one application system, mapped into a neutral format, transmitted to a partner via a VAN (Value-Added Network), mapped by the partner into a format suitable for its application, and imported into the partner application. Alternatively, direct dialing may be substituted for the VAN. EDI, however, is generally batch oriented, requires extensive format customization and does not support processes.

The third approach, used when business requirements do not fit the EDI model, is to use a custom system designed and implemented to the users' specifications. This approach is costly, requires a mixture of network programming and system integration tasks, and serves a specific purpose for specific users only. Furthermore, it is inflexible and difficult to modify.

Recently, two trends in technology have radically changed the ways in which application systems may be intertwined. As a result, a fourth and fifth approach, as well as an adaptation of EDI, must be added to the three discussed above. The first trend is the rapid expansion of network infrastructure. The most visible component of this infrastructure is the ubiquitous connectivity provided by the Internet. Nearly all organizations are, or soon will be, connected to the Internet. Coupled with this connectivity is an expanding set of middleware technologies and services such as distributed object frameworks and message oriented middleware that facilitate more tractable distributed applications and promise far greater interoperability of software components.

The second trend involves advances in the enterprise application systems that are used by companies. Key advances in these systems include development of object interfaces and the development of workflow/process modeling capabilities. Object interfaces provide a more flexible and less taxing method of moving information to and from applications than prior methods such as SQL (Structured Query Language) or file-based interfaces. Several application vendors now provide the ability to design and implement workflow among different application modules. This capability allows companies to more easily focus on their business processes and makes more obvious the need to connect the processes of business partners.

The most visible impact of these trends, and the fourth approach to extending business interdependency, is the use of the World Wide Web for business-to-business interactions. In this model, an employee in one business accesses information, such as catalog or shipping information, pertaining to the business applications of another company by using a standard Web browser. This approach, however, is ill-suited to many extended enterprise processes that require dependent interactions among the application systems of different organizations.

The fifth approach exploits recent middleware technology which makes possible the creation of high-performance distributed applications that are logically integrated. Though the same technology may be used to provide interoperation among application suites from different vendors and among systems at different businesses, significant challenges limit feasibility. Foremost, employing middleware technology is a programming task that requires significant programming skill and special understanding of security, synchronization, and other network issues. The cost of such an endeavor may be justified for the vendor of a distributed application, but companies wishing to engage in a specific extended enterprise process are unlikely to devote the capital required to build distributed systems from the ground up.

Finally, the adaptation of EDI, referred to as Internet-EDI, is actually a number of methods that attempt to move the traditional EDI approach discussed above to an Internet transport medium. These methods are motivated by the desire to reduce high transport costs associated with Value-Added Networks (VAN's). Effectively, these methods diverge very little from traditional EDI. The same message formats, mapping software, and even enveloping constructs are employed. Use of an open network, however, requires additional security, reliability and auditing capabilities than were formerly part of a VAN service. In addition, the use of these additional services in an open network configuration must be supported by software at the endpoints of an information exchange. Internet-EDI, therefore, suffers from key limitations such as a lack of process support, an unwieldy representation formalism, and an integration model that does not mesh with new practices.

The approaches above fail to meet the increasing demand to implement between disparate systems complex, automated processes that are both secure and maintainable. Thus, a system and method to plan and control extended business interdependency are needed that (1) focuses specifically on peer-to-peer interactions among existing business application systems, (2) supports secure and reliable communication, (3) minimizes custom software development, (4) has functionality to handle heterogeneous data representation formalisms and (5) has the ability to support complex processes that extend into and out of enterprise applications.

SUMMARY OF THE INVENTION

The present invention is a system and methods for creating, executing, and maintaining cross-enterprise processes. Cross-enterprise processes are shared automated business processes or workflows among distributed information systems that include specific provisions for automation of these processes across organizational boundaries and among heterogeneous information systems.

The system is comprised of a plurality of independent communicating subsystems called sites with common capabilities. Each of the sites includes a server with common means of representing and executing shared process definitions. These sites act in concert in the course of executing shared inter-system processes. Process execution comprises coordinated inter-site message exchanges that are coupled with controlled sequences of actions that are local to each of the sites. In addition, each site may include any one of a number of applications programs and operating systems for executing the inter-system processes and internal processes on the server.

Automated inter-system processes are represented in the system of the present invention in a two-level process model. The top level or public process definition/module captures interactions among the independent sites (each typically representing an organization or business unit). Interactions include communication events in which one site, designated in the public process definition by a node, sends a message of a known type to another site. The public process definition, then, is a logical grouping or directed graph of interdependent communication events among a set of sites. Each definition specifies a set of valid sequences of communication events among the participating sites.

Associated with any public process definition is a set of lower level or private process definitions or modules. A separate private process definition is bound to each node in a public process. The private process definition specifies a set of possible local actions that can be executed at the site when that particular public process node is executed. In the preferred embodiment, the private process definition is defined in terms of constructs such as operating parameters and software application interactions specific to the node or site.

DESCRIPTION OF THE PREFERRED EMBODIMENT

Figure 1:
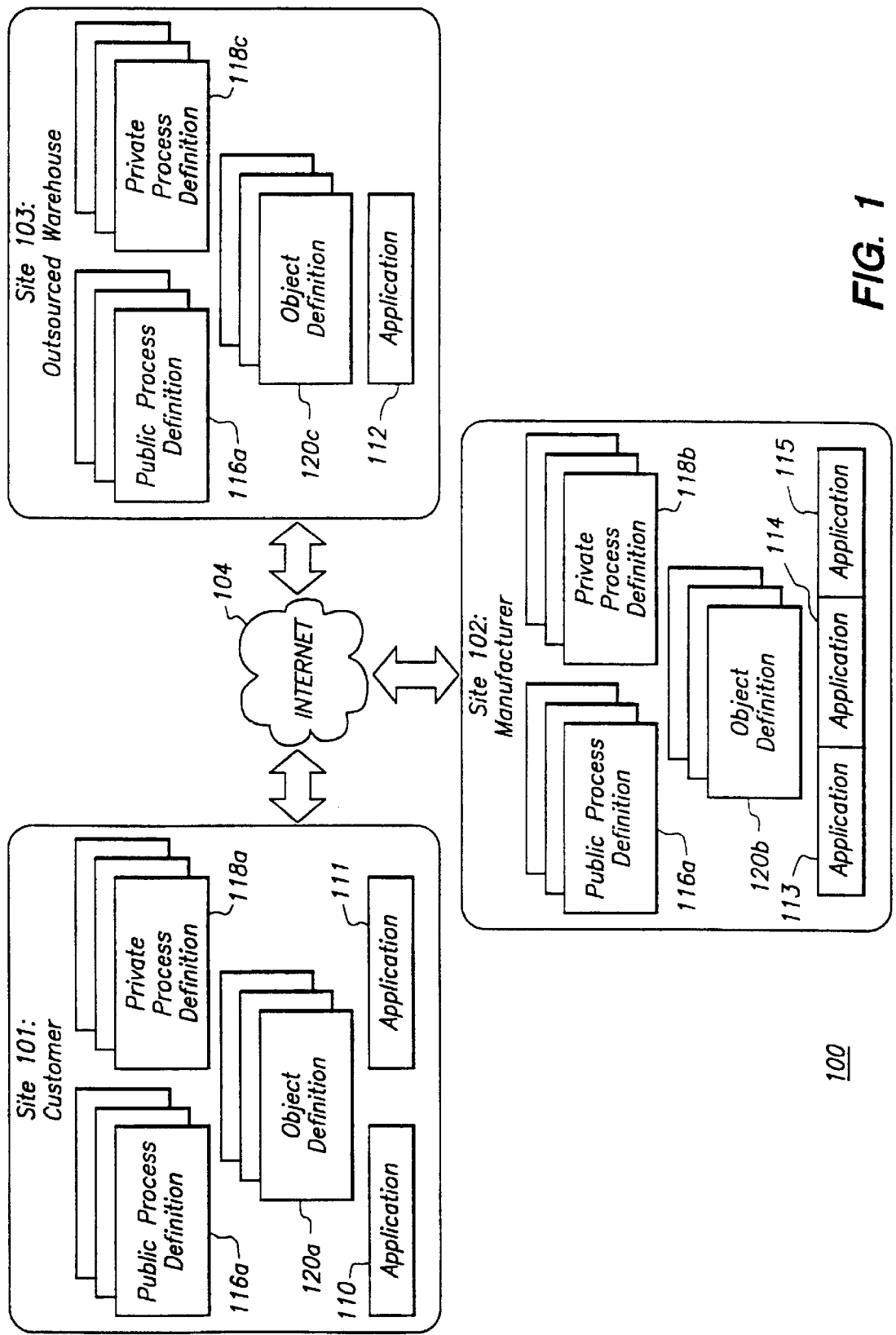
FIG. 1 is a block diagram of an extended enterprise including a plurality of sites having public process definitions and private process definitions in accordance with the present invention.

Referring to FIG. 1, a preferred embodiment of an extended enterprise system 100 is shown. The extended enterprise system 100 of the preferred embodiment of the present invention preferably comprises a plurality of sites 101, 102 and 103 installed at distinct organizations that are coupled by a communications network 104. These sites 101–103 form an extended enterprise 100 in which the internal processes of each site 101–103 are coupled with the internal processes of other sites 101–103 via coordinated sequences of information exchanges. For example, sites 101–103 may be business enterprises that comprise three elements of a supply chain: supplier, manufacturer and customer. Those skilled in the art, however, will recognize that the sites 101–103 could for any type of business unit or function, that there may be any number of site, and three sites 101–103 are provided only by way of example.

Each of these sites 101–103 represents a zone of control and is comprised by a set of application systems that store information and contain logic for retrieving and modifying that information. Example applications include ERP (Enterprise Resource Planning) application suites, Product Data Management (PDM) systems, logistics applications, and advanced planning systems (APS).

Operation of the present invention includes coordinated sequences of actions within each site 101–103 that are linked with coordinated sequences of information exchanges among different sites 101–103. The actions executed within each site 101–103 include primarily the movement of information into and out of the applications associated with sites 101–103. Each exchange of information between sites 101–103 is preceded by a sequence of actions within the sending site and is followed by another sequence of actions within the receiving site. Accordingly, these site-specific sequences of actions serve as the connections that bind a set of information exchanges into a single coordinated sequence of interactions.

Figure 2:
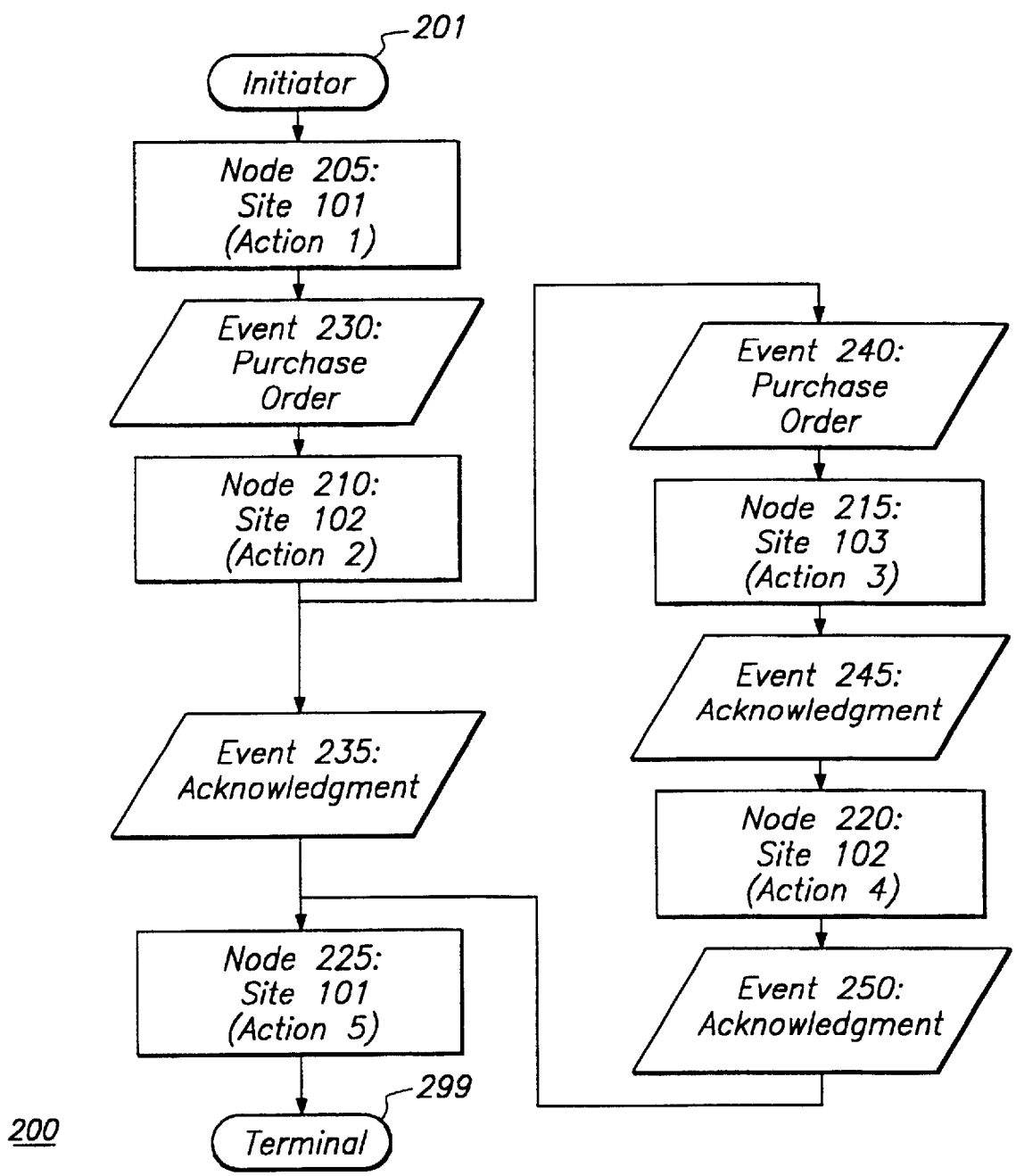
FIG. 2 is a graphical representation of a public process definition including node, arcs and connections between them in accordance with the present invention.

The possible sequences of local actions and site to site exchanges are specified through a process definition language. This language allows for complex branching and looping logic and can capture constraints that govern the relationships between local action sequences and site to site exchanges. More formally, the process definition language of the preferred embodiment includes node and arc elements that are combined with a specific ordering and logic to create a directed graph (such as depicted in FIG. 2 and as will be described below). A single source node 205–225 and a single destination node 205–225 define each arc element. Each node 205–225 includes a set of input arcs and associated logic connecting it to antecedent nodes 205–225 and a set of output arcs and associated logic connecting it to consequent nodes 205–225. The relationship between the input arcs for a given node 205–225 is defined by a logical sentence, containing possibly nested conjunctive and disjunctive propositional connectives, in which each arc is represented by a distinct propositional symbol. The output arcs for a given node are related by a separate logical sentence of equivalent form. Node 201 has no input arcs and is referred to as an initial node. Nodes 299 that have no output arcs are referred to as terminal nodes.

In the preferred embodiment, a two-level process model is used to represent the collection of site-to-site information exchanges and site-specific sequences of actions. A public process definition or module 116a specifies the relationship between all site-to-site information exchanges. The sequence of possible actions within a single site 101, 102, 103, for a particular node in a public process definition 116a, is specified by a private process definition or module 118a, 118b, 118c. Both the public and private process definitions 116a, 118a, 118b, 118c are built on top of the process definition language with special interpretations for node 205–225 and arc elements. In a public process definition 116a, each node element represents a specific site 101, 102, 103 and each arc element represents a message with specific information contents that are sent from the site 101, 102, 103, represented by the arc's source node to the site represented by the arc's destination node. The graph for a public process can include only a single initial node. The public process definition 116a, then, is a specification of "who does what when" among a set of sites 101–103 for a particular purpose. Each public process definition 116a specifies a set of valid sequences of communication events among the participating sites 101, 102, 103. More specifically, the same public process definition 116a is provided to each site 101, 102, 103 having an action in the public process definition 116a. As shown in FIG. 1, each site 101, 102, 103 may have one or more public process definitions 116a, one for each inter-site process. In a private process definition 118a, 118b, 118c, node elements represent specific programmatic actions and arc elements specify the order in which these actions are executed. The private process definition 118a, 118b, 118c specifies how sites 101–103 process received messages and construct outgoing messages. Moreover, private process definitions 118a, 118b, 118c specify what happens within a node of public process definition 116a. Thus, the private process definitions 118a, 118b, 118c include routines and processes that are tailored to the particular site 101, 102, 103 to which the private process definitions 118a, 118b, 118c is assigned or operates upon. Still more particularly, the private process definitions 118a, 118b, 118c are designed for inter-action using the operating systems, applications and resources of the site to which it is assigned. Thus, as depicted in FIG. 1 each of the private process definitions 118a, 118b, 118c is different for each site 101, 102, 103. Nonetheless, when sites 101, 102, 103 are similarly configured (e.g., have the same operating systems, applications and resources) the private process definitions 118a, 118b, 118c may be used or shared. Those skilled in the art will recognize that each site 101, 102, 103 may also include a plurality of private process definitions 118a, 118b, 118c as depicted in FIG. 1. The plurality of private process definitions 118a, 118b, 118c may be for one public process definition 116a or different public process definitions 116a.

The preferred embodiment models the information contained in the messages sent between sites 101, 102 and 103 as objects with restricted structure and behaviors. These objects are data containers whose possible contents are specified by object definitions 120a, 120b, 120c. In the preferred embodiment, an object definition 120a, 120b, 120c takes the form of an XML (Extensible Markup Language) DTD (Document Type Definition). This definition specifies the lexical and grammatical form of all objects of that type. Object definitions 120a, 120b, 120c are referenced by both public and private process definitions.

Figure 3:
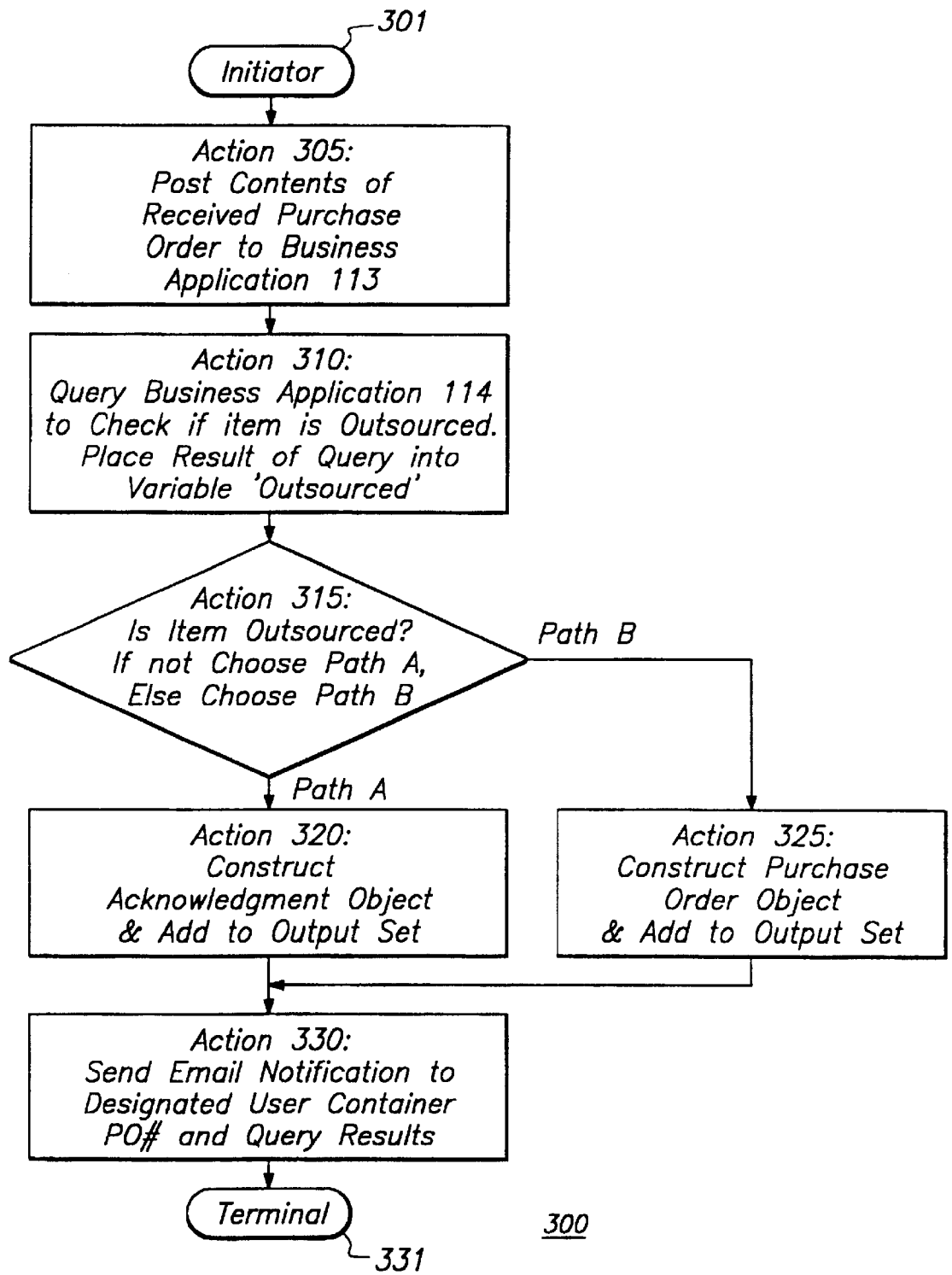
FIG. 3 is a flow diagram of the process for executing a private process definition in accordance with the present invention.

Referring now to FIG. 2, an exemplary public process definition 200 is shown. The public process definition 200 is represented graphically as a flow chart. FIG. 2 shows a public process definition 200 that specifies a set of possible interactions among sites 101–103. Process 200 comprises a set of nodes 205 through 225 and a set of communication events 230 through 250. Each node corresponds with a specific site 101–103, and associated with each node 205 through 225 of public process definition 200 is a private process definition 118a, 118b, 118c. FIG. 3 shows an exemplary private process definition 300 associated with node 210.

Each communication event 230–250 that connects one node to another in a public process definition 200 represents the exchange of a message of a known object type. For example, the known objects maybe any one of the conventional types of business objects such as a purchase order object, a confirmation message object, etc. Such objects 120a, 120b, 120c are defined in the object definition 120a, 120b, 120c so that each site 101, 102, 103 may use the object definitions 120a, 120b, 120c as needed to process objects on either the public level or the private level. In other words, public process definition 200 is a logical grouping or a directed graph of interdependent communication events 230–250 among the sites 101–103 shown in FIG. 1. This grouping specifies a set of valid sequences of communication events among the participating sites 101, 102, 103. Specifically, public process definition 200 describes at communication event 230 a purchase order sent from site 101 to site 102. This purchase order is generated by the private process of site 101 associated with node 205. Node 210 is a branching node, and two communication events, 235 and 240, are produced at that node. Depending on a specified branch condition, either one of the events occurs or both events occur. The conditions under which these two events trigger are not indicated by public definition 200, since they are known only to the site 102. These conditions are contained in private process definition 118b associated with node 210, and thus site 102. Those skilled in the art will also recognize that the private process definition 118b may be a set of private process definitions that correspond to an instance of a public process definition 116a.

The occurrence of events 235 and/or 240 causes the execution of the node(s) that immediately follow and execution proceeds downward on the Figure. Node 225 represents a branch junction node that can wait for one or all events of a set that connect to it. Following execution of node 225 the public process terminates at terminal 299.

Associated with each node 205 through 225 of public process definition 200 is a private process definition 118a, 118b, 118c. For example, FIG. 3 shows a private process definition 300 associated with node 210. Unlike the public process definition 200, the content of private process definition 300 is determined and known solely by the corresponding site, site 102 in this case. Private process definition 300 includes a number of actions 305 through 330 that are controlled according to a specified logic. Possible actions include external business application interactions, script execution, user notification and approval, time delay, output object specification, and sub-process execution. All instances of the private process definition 300 have access to the object of type 'Purchase Order' that is contained in communication event 230. Any action in private process definition 300 can reference this object. Private process definition 300 is constrained to produce a object either of type 'Acknowledgment' or of type 'Purchase Order' corresponding to communication events 235 and 240 respectively.

Referring now to FIG. 3, one exemplary embodiment for a private process definition 300 is shown. Private process definition 300 begins at initiator action 301 that executes after communication event 230 completes. Those skilled in the art will recognize that the process would be similar for a variety of other private process definitions such that once the object is transferred to or received by the site 101, 102, 103, the private definition corresponding to the node following the communication event is automatically started. Private process 300 continues to action 305. Action 305 execution entails posting an information block corresponding to the received purchase order into business application 113. Following completion of action 305 execution continues to action 310. Action 310 entails querying business application 114 to determine if the item associated with the Purchase Order of communication event 230 is locally stocked or if the item is outsourced. The result of this query is put into a variable named 'OUTSOURCED' in a set of variables associated with private process 300. Action 315 is executed subsequent to action 310. Action 315 entails an IF-THEN-ELSE conditional test on the value of OUTSOURCED inside of a script action. Results of this conditional test determine whether path A or path B is followed subsequent to action 315 completion. Path A execution proceeds to action 320, which entails the construction of a object of type 'Acknowledgment' and its designation as an output of the private process. Path B execution proceeds to action 325, which entails the construction of a object of type 'Purchase Order' and its designation as an output of the private process. Paths A and B terminate in action 330, which entails notification of a designated user via electronic mail of certain status information associated with the running process. This information includes identifying characteristics of the purchase order and results of business application queries. Following execution of action 330, the private process. terminates, and control returns to the public process level. The use of such public definitions particularly advantages because it provides uniform control and regulation of the inter-site processes, while allowing maximum flexibility through the use of private definitions that allows the controller of a particular site to implement the private definition in any number of ways according to parameters, resources, and other constraints for a particular site.

Figure 4:
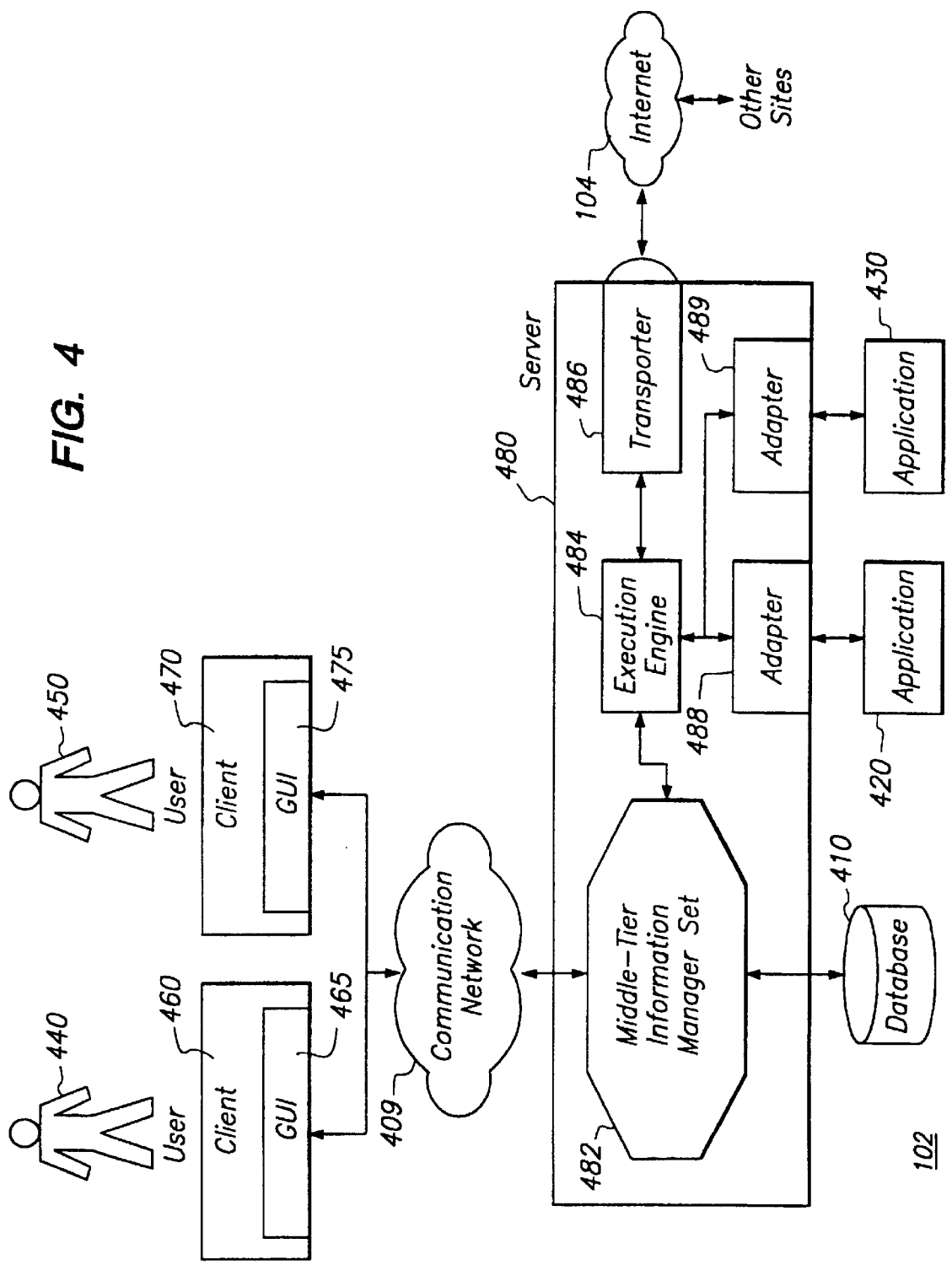
FIG. 4 is a block diagram of a system in accordance with the present invention.

Each site of the preferred embodiment includes a combination of components that support the design, implementation and maintenance of public and private processes and the runtime components that support the execution of these processes. FIG. 4 shows the preferred configuration of an example site 102.

Figure 8:
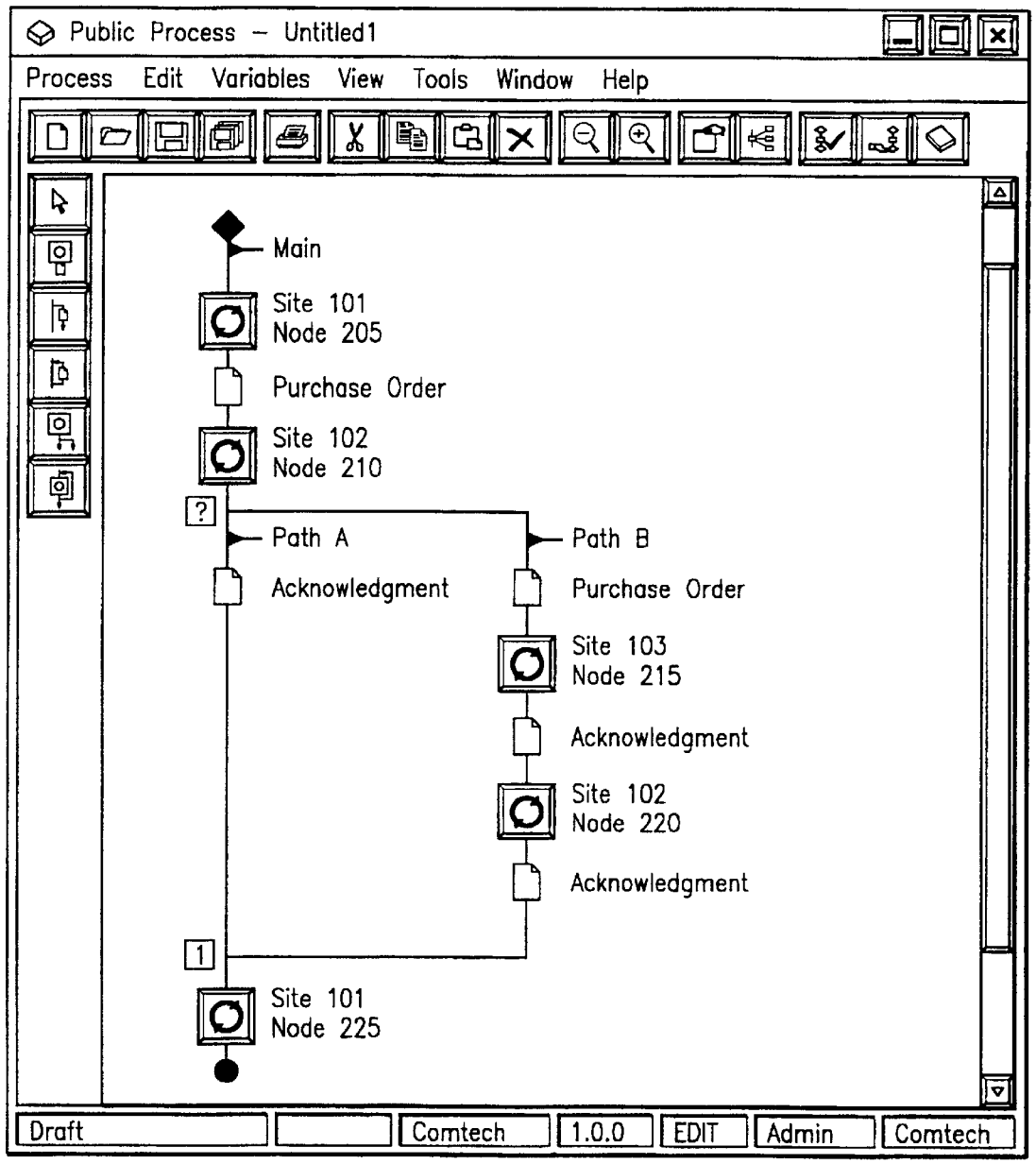
FIG. 8 is a graphical representation of a display device showing a graphical user interface for editing the public process definition.
Figure 9:
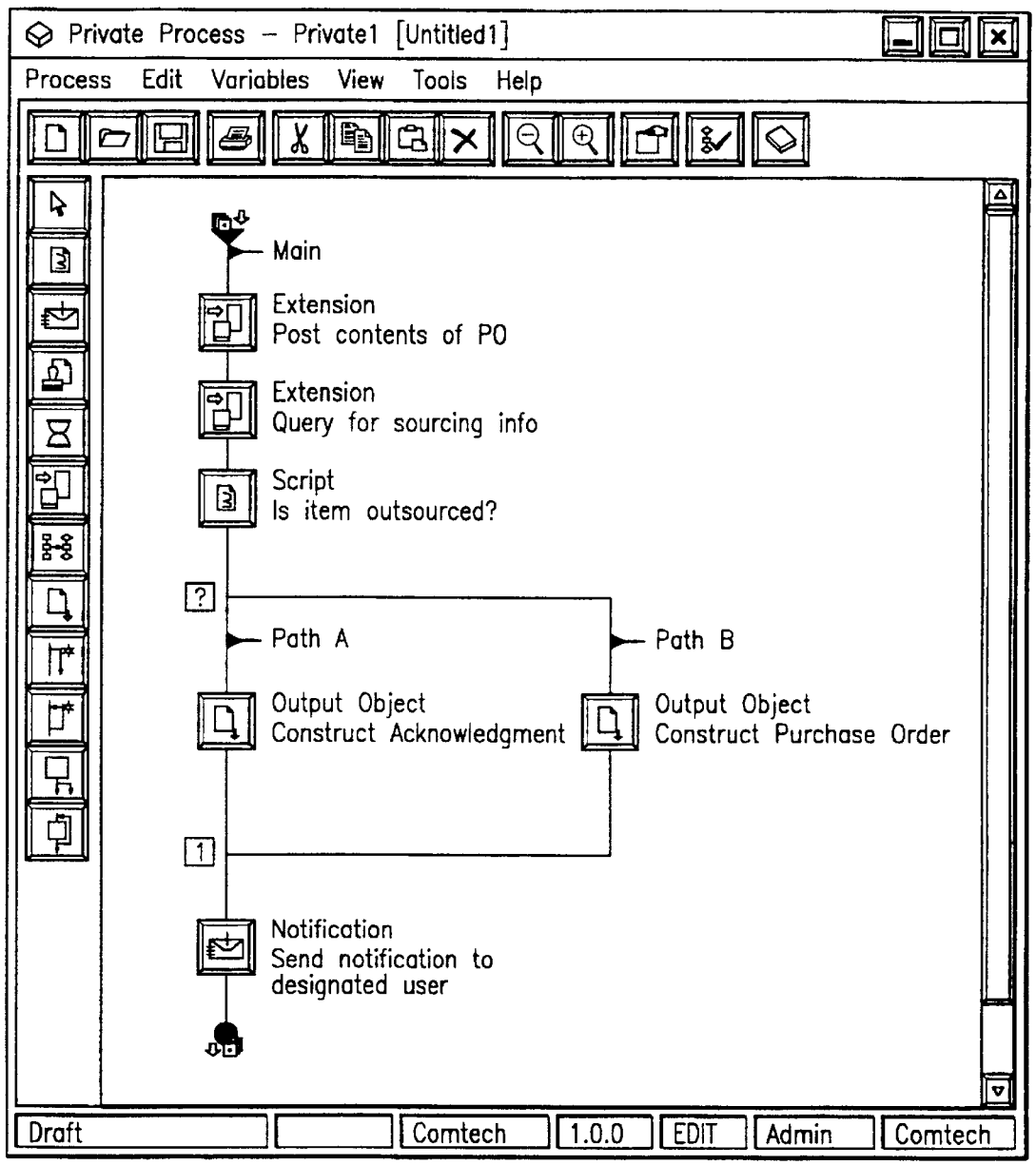
FIG. 9 is a graphical representation of a display device showing a graphical user interface for editting the private process definition.

The standard site 102 is comprised by a single server 480 and one or more clients 460, 470 that communicate with the server over a network 409. Clients 460 and 470 and server 480 run on separate host computers. Clients 460 and 470 contain graphical user interfaces (GUI's) 465 and 475 respectively. In addition, server 480 includes or has access to database 410 and applications 420 and 430. In the preferred embodiment, database 410 resides on a host computer that is separate from the one on which server 480 is located. Clients 460 and 470 and server 480 share common representations of relevant information by interacting over network 409 according to a specified and conventional communication protocol. Such shared information representations include public and private process definitions, object definitions, process execution histories, as well as information about other sites with which the site interacts. Human users 440 and 450 interact with site 102 via client GUI's 465 and 475 to view, create, edit, and manage the shared information representations delimited above. For example, users 440 and 450 are able to view and edit graphical representations of public process 200 and private process 300 on GUI's 465 and 475. FIGS. 8 and 9 shown a screen shot of the GUIs corresponding to the public and private process definition described above with reference to FIGS. 2 and 3, respectively.

The server 480 of the preferred embodiment is comprised of a middle-tier manager set 482, an execution engine 484, a transport manager 486 and adapters 488 and 489. The middle-tier manager set 482 controls the access and flow of information between network 409, engine 484, and database 410. In addition, it implements associated application logic, and insures the consistency of information between these elements. With respect to network 409, set 482 mediates access to information from concurrently operating clients and other components of server 480.

As discussed in detail below, the installation of public and private processes 200 and 300 requires the prior approval of user 440 or 450. Once this approval is received, it is entered by the appropriate user into client 460 or 470 via the respective GUI. A local install signal is then relayed over network 409 to server 480. Manager set 482, acting upon the received signal, initiates the installation of the process definitions into engine 484. During installation, the execution engine 484 transforms the process definitions it receives into executable state machines which are saved in database 410. This transformation extracts from the public process definition all nodes connected to arcs involving the target site. The resulting state machine contains all information necessary for a single site to participate in the execution of the original public process. Once the installation is complete, manager set 482 provides engine 484 with any additional information stored in database 410 or received from clients 460 and 470 needed to perform process execution. Persistence of shared data is maintained by communication with database 410.

Once the installation of private and public process definitions 200 and 300 is complete, engine 484 controls their execution. During execution, the execution engine 484 manages two key activities: inbound and outbound communication with other sites via transport manager 486 and interactions with applications 420 and 430 via adapters 488 and 489. The engine 484 also manages through manager set 482 several auxiliary activities including the sending and receiving of messages to and from users 440 and 450 and the storage of log information in database 410.

During the execution of a public process definition, such as definition 200, transport manager 486 manages communications to and from Internet 104. For example, public process definition 200 anticipates the reception of purchase order 230 and acknowledgment 245 by site 102, as well as the sending of acknowledgment 235 and purchase order 240. In this capacity, manager 486 preferably handles retry and acknowledgment logic (based on the properties of the service it is using). Messages are created outside of any specific transport service and communication security is message based. Non-repudiation receipts for both origin and delivery are supported.

During execution, adapters 488 and 489 mediate the flow of data between the execution engine 484 and external applications 420 and 430. For example, referring to step 315 of private process definition 300, engine 484 may transmit a request through adapter 488 or 489 that application 420 or 430 determine whether the item in question is outsourced. In turn, the application will respond through the respective adapter. Adapter configuration options for 488 and 489 are set by authors of private processes for the associated site. These adapters 488 and 489 communicate their acceptable configuration options to the middle-tier manager set 482 at the time of their installation. The configuration interface for adapters 488 and 489 allows a private process to insert data into an external application, retrieve data from an external application or listen for a specific event produced by the external application, where the inserted, retrieved or listened for data is represented by an object definition. Adapters 488 and 489 also insure uniform properties of state/consistency management and auditing behavior across the different applications that can be integrated with the system. During process execution, adapters 488 and 489 map the insertion, retrieval and listened for actions specified in a private process into specific interactions with target applications 420 and 430.

Figure 5:
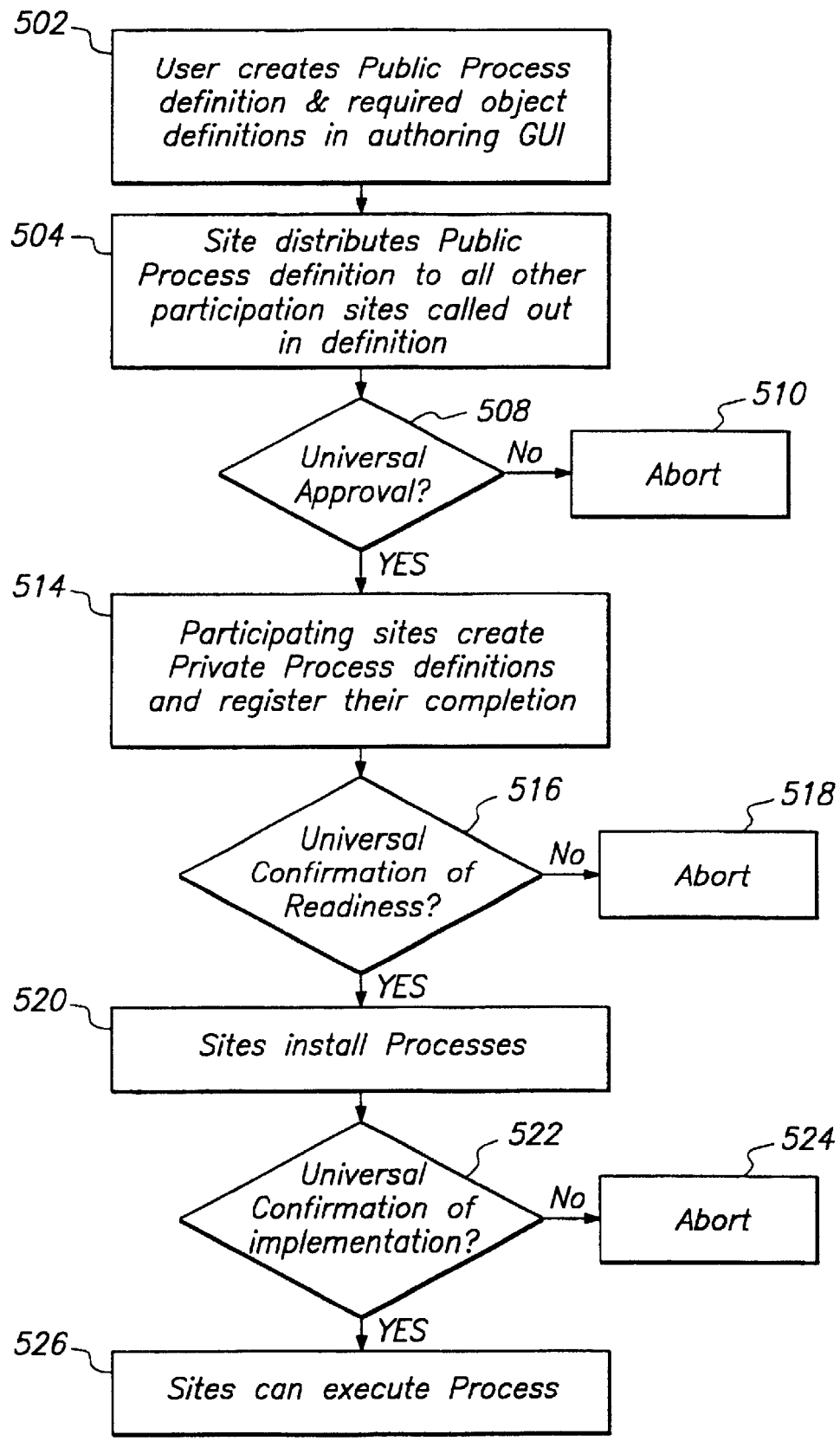
FIG. 5 is a flow diagram of a method for distributing a public process definition in accordance with the present invention.

Operation of a site of the preferred embodiment revolves around the life cycle of a public process definition and the associated private process and object definitions. Shown in FIG. 5, this cycle begins with the creation of a public process definition and referenced object definitions then continues with the distribution of the public process definition and object definitions, creation of the necessary private process definitions, installation of the process, and ends with process execution.

In step 502, the user creates a public process definition. The site at which the public process definition 200 is created is referred to as the authoring site. Creation of the public process definition 200 includes the creation of all object definitions that represent site-to-site messages in the public process definition. In the preferred embodiment, both public process and object definitions are created by users 440 and 450 interacting with manager set 482 through client GUI's 465 and 475. During creation of public process definition 200, for example, user 440 specifies the sequence of interactions among all participating sites 101, 102 and 103 and the logic connecting these interactions. In this example, GUI 465 would present definition 200 as a set of icons interconnected by flow indicators that would appear much as the diagram in FIG. 2. Definitions for the purchase order, acknowledgment and rejection objects would also be created by user 440 via GUI 465 if they did not pre-exist.

After the public process and necessary objects have been defined, the user proceeds with distribution of the process. In step 504, the authoring site sends over the internet 104, the authored public process definition and referenced object definitions to all sites participating in the public process. Those skilled in the art will recognize that internet 104 may be a intranet on a local area network (LAN), an internet on a wide area network (WAN), or the Internet. In this case, site 102 is the authoring site and sites 101 and 103 are the participant sites. In order for site 102 to send public process definition 200 and associated object definitions over the Internet, the definitions are sent from manager set 482 to transport manager 486 and from there to the transport managers of the participant sites. Upon receipt of public process definition 200 and object definitions by the participant site transport managers, in this case sites 101 and 103, the definitions are passed from the transport manager to the middle-tier managers for persistent storage in the site database. After reviewing received public process definition 200 and object definitions via a client GUI, users at the participant sites 101 and 103 must approve or disapprove the public process definition, said approval or disapproval being sent via the transport managers of the partner sites to the authoring site. While public process definition 200 is being reviewed at participant sites 101 and 103, authoring site 102 waits for the approval or disapproval votes to be received by transport manager 486 in step 508. The approval or disapproval by sites 101 and 103 is likely to turn on commercial, rather than technical, concerns. If a partner site finds the commercial arrangements described in definition 200 acceptable, it returns an approval signal to the authoring site, in this case site 102. In step 508, the system tests for universal approval, if either participant site 101 or 103 disapproves of public process 200, authoring site 102 will distribute an abort message through transport manager 486 to partner sites 101 and 103, thus reaching step 510. In this case, public process definition 200 is abandoned and sites 101, 102 and 103 may start negotiating for a new public process definition. If the public process definition is universally accepted in step 508, the authoring site 102 distributes a commit message to each of the partner sites.

After the commit messages have been transmitted by the authoring site and received by the participant sites, both the authoring site and participant sites proceed with creation of the private processes associated with the public process nodes owned by each site. This is represented by step 514 in FIG. 5. Each site user creates a private process definition for each node of the public process definition associated with the user's site. For example, user 440, creates private process definition 300 for node 210 and an accompanying private process definition for node 220, since nodes 210 and 220 are each associated with site 102. Likewise, a user at site 101 would create private process definitions for nodes 205 and 225. while a user at site 103 would create a definition for node 215.

After successfully implementing the necessary private process definitions, each participant site sends a message to the authoring site signaling completion of private process implementation. In step 516, the authoring site gathers private process completion signals from all sites. If any site fails to implement one or more private processes, it will send a failure message to the authoring site. In this case, the implementation process will be aborted (step 518), and process definition 200 will be abandoned. Once the authoring site has received messages from all participant sites indicating successful private process implementation, and has successfully implemented its own private processes, the authoring site can begin the installation process (step 520).

Figure 6:
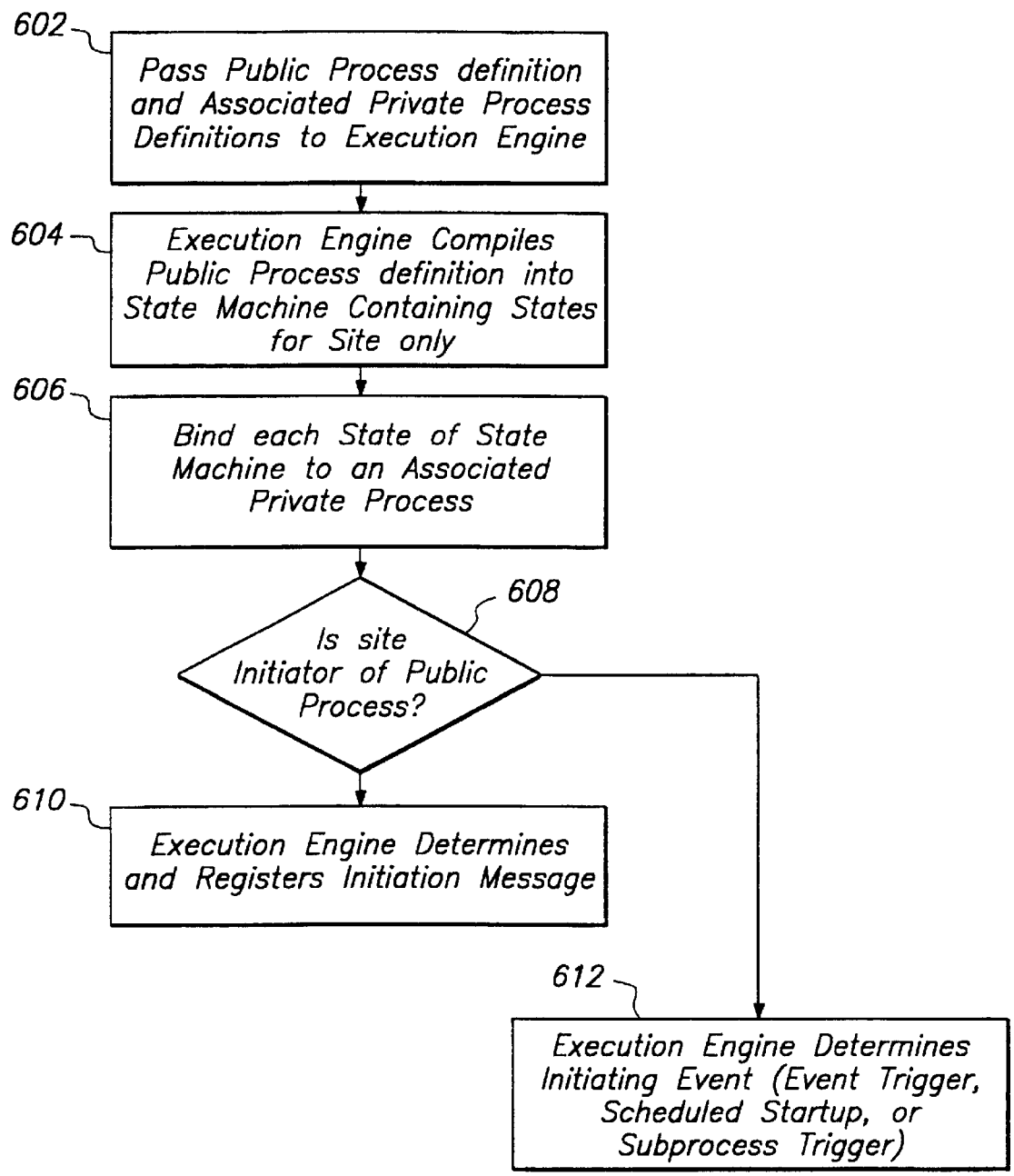
FIG. 6 is a flow diagram of a method for the installation of a public process definition in accordance with the present invention.

Process. installation (step 520) begins with the authoring site sending installation messages to all participant sites. After receiving the installation message, each participant site locally installs the public process. FIG. 6 shows a flow diagram of a process for installing at a single site the private process definitions associated with a public process definition. In step 602, the public process definition and associated private process definitions are passed from manager set 482 to execution engine 484. In step 604, the public process definition is compiled to produce a state machine that contains states only for the site in question. For example, the process of compiling public process definition 200 at site 102 will result in states associated with nodes 210 and 220. Recorded in the state machine is a triggering event for each state. Continuing with the example of public process definition 200, site 102 records that event 230, a purchase order from site 101, triggers the state associated with node 210, and that event 245, an acknowledgment from site 103, triggers the state associated with node 220. In step 606, each state of the state machine is bound by a "call" command with an associated private process definition. For example, site 102 will bind private process definition 300 with the state associated with node 210. The result of this binding is that when the state associated with node 210 is triggered by a purchase order from site 101, private process definition 300 is called and executed. In step 608, a determination is made as to whether the site in question is the initiator of the public process. If not, as in the example of site 102, the execution engine determines the triggering message to be received and registers it in the transport manager. In the example of site 102, the two triggering messages are purchase order 230 from site 101 and acknowledgment 245 from site 103. If the site is the initiator of a public process, the triggering event for the first private process is internal to the site and is registered in step 612 as an event trigger, a scheduled startup, or as a subprocess trigger.

After successfully installing the public process, each participant site sends an installation confirmation message back to the authoring site. In step 522, the authoring site collects installation confirmation messages from all participant sites. If any site is unable to install the public process, the process is aborted 524 as described above. Successful installation at the authoring site triggers the transmission of messages to all participants indicating that the public process has been installed at all involved sites. At this point the process is ready for execution (step 526).

Figure 7:
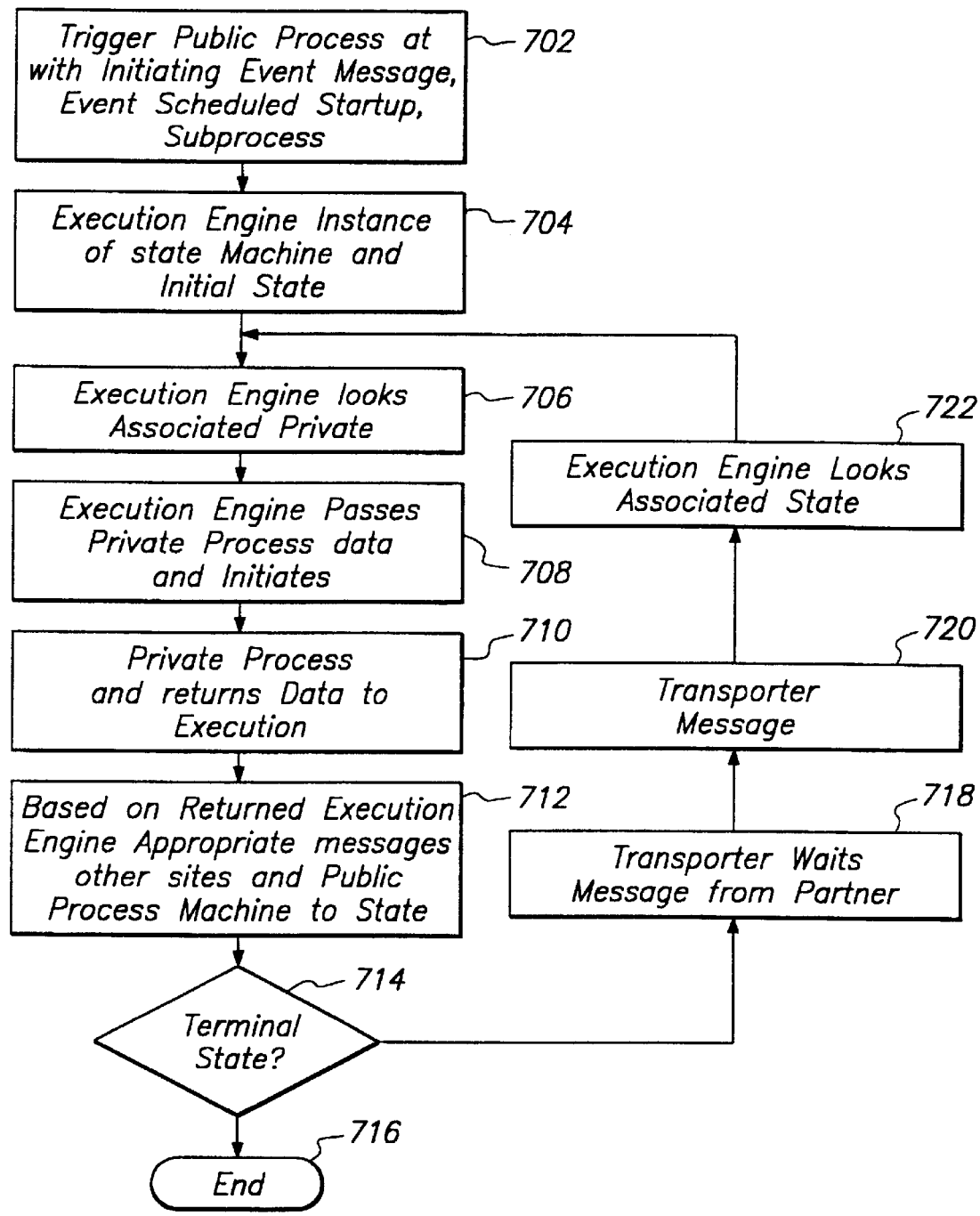
FIG. 7 is a flow diagram of a method for executing an instance of a specific process type in accordance with the present invention.

As discussed above, the execution of a public process is actually performed by the interactive executions of the associated private processes at the partner sites. The execution of an installed public process by a single site is shown in FIG. 7. Execution begins in step 702 with an initiating event that can include the following: receipt of a message from a partner site, an event associated with an application, a scheduled startup, or a subprocess trigger. For example, node 210, of public process definition 200, is triggered by the receipt of a purchase order message from site 101. In step 704, the execution engine at the triggered site creates an instance in the appropriate state machine and sets the machine to the initial state. In step 706, the execution engine fetches the private process associated with the associated public process node. For example, upon the triggering of node 210, private process definition 300 is accessed. In step 708, the execution engine passes appropriate data including the contents of the event 230 to the private process and initiates its execution. In step 710, the private process executes and returns data to the execution engine, and in step 712, the execution engine acts upon the basis of the returned data. For example, private process 300 returns to execution engine 484 either an instruction to send an acknowledgment to site 101 or a purchase order to site 103. It is noted that during the execution of the private process in step 710, engine 484 may make use of applications 420 and 430. Execution engine 484 responds accordingly. In step 714, a determination is made by the execution engine as to whether a local terminal state of the public process definition has been reached. This determination is a local determination and is limited to the participation of the site in the public process. For example, the completion of node 220 is a local terminal state for site 102, since it is the final node in process 200 that corresponds with site 102. Likewise, depending on the outcome of the accompanying private process, the completion of node 210 may be a local terminal state for site 102. If local termination is encountered, the public process ends for the site in step 716. Step 716 is not complete until a two-phase commit protocol has been executed among sites 101, 102, and 103 ensuring mutual completion of process 200 execution.

If the local terminal state is not encountered in step 714, the transport manager waits for triggering messages from partner sites (step 718). For example, if the result of node 210 is the transmission of a purchase order in event 240, transport manager 486 waits for the acknowledgment of event 245 to trigger the private process associated with node 220. Once the triggering message is received in step 720, the execution engine looks up the associated process state in step 722. The private process then begins execution at step 706 and is performed as described above.

What is claimed is:
1. A method for coordinating a process between a first site and a second site using a public process definition that specifies interactions between sites, the public process definition comprised of a first node associated with the first site, a second node associated with the second site, and a business object connected to the first and second nodes, the method comprising the steps of:
   distributing the public process definition to the first site and the second site, including creating the public process definition at the first site;
   executing the first node of the public process definition at the first site by executing a first private process definition associated with the first node, the first private process definition specifying a set of possible local actions that can be executed at the first site when the first node is executed;
   upon receiving a message defined by the business object, executing the second node of the public process definition at the second site by executing a second private process definition associated with the second node, the second private process definition specifying a set of possible local actions that can be executed at the second site when the second node is executed;
   at the first site, associating with the first node by shared information a first private process definition containing an action preceding the transmission of the message from the first site; and,
   at the second site, associating with the second node by shared information a second private process definition containing an action following the reception of the message by the second site.

2. The method of claim 1, wherein the step of distributing further comprises:
   reviewing the public process definition at the second site; and,
   in the event of an approval of the public process definition at the second site, transmitting an approval signal from the second site to the first site; and,
   in the event of a disapproval of the public process definition at the second site, transmitting a disapproval signal from the second site to the first site.

3. The method of claim 2, wherein the step of distributing further comprises:
   in the event of receiving at the first site an approval signal from the second site, transmitting a commit message to the second site;
   installing the public process definition and the first private process definition at the first site; and,
   in the event of receiving at the second site the commit message from the first site, installing the public process definition and the second private process definition at the second site.

4. The method of claim 3, wherein the step of distributing further comprises:
   in the event of receiving at the first site a disapproval signal from the second site, transmitting an abort message to the second site.

5. The method of claim 1, further comprising:
   at the first site, transforming the public process definition into a first state machine; and,
   at the second site, transforming the public process definition into a second state machine.

6. The method of claim 1, further comprising:
   recording in a first process execution history the execution of the first node of the public process definition;
   recording in a second process execution history the execution of the second node of the public process definition;
   auditing the first and second process execution histories.

7. A method for coordinating a process between a first site and a second site using a public process definition that specifies interactions between sites, the public process definition comprised of a first node associated with the first site, a second node associated with the second site, and an arc connected to the first and second nodes, the method comprising the steps of:
   distributing the public process definition to the first site and the second site;
   executing the first node of the public process definition at the first site by executing a first private process definition associated with the first node, the first private process definition specifying a set of possible local actions that can be executed at the first site when the first node is executed; and
   upon receiving a message defined by the arc, executing the second node of the public process definition at the second site by executing a second private process definition associated with the second node, the second private process definition specifying a set of possible local actions that can be executed at the second site when the second node is executed.

8. The method of claim 7, wherein the arc is a business object.

9. A method for coordinating a process between a first site and a second site, comprising:
   creating at the first site a public process definition that specifies interactions between sites, the public process definition including a first node associated with the first site, a second node associated with the second site, and an arc interposed between the first node and the second node;
   distributing the public process definition to the second site;
   creating at the first site a first private process definition associated with the first node, the first private process definition specifying a set of possible local actions that can be executed at the first site when the first node is executed and in which an action preceding the transmission of a message from the first site is defined;
   creating at the second site a second private process definition associated with the second node, the second private process definition specifying a set of possible local actions that can be executed at the second site when the second node is executed and in which an action following the reception of the message by the second site is defined;
   executing the first node of the public process definition by executing the first private process definition at the first site; and
   upon receiving the message, executing the second node of the public process definition by executing the second private process definition at the second site.

10. A method for creating a process definition governing a process between a first site and a second site, comprising:
   creating at the first site a public process definition that specifies interactions between sites, the public process definition including a first node associated with the first site, a second node associated with the second site, and an arc interposed between the first node and the second node;
   distributing the public process definition to the second site;
   creating at the first site a first private process definition associated with the first node, the first private process definition specifying a set of possible local actions that can be executed at the first site when the first node is executed and in which an action preceding the transmission of a message from the first site is defined; and creating at the second site a second private process definition associated with the second node, the second private process specifying a set of possible local actions that can be executed at the second site when the second node is executed and in which an action following the reception of the message by the second site is defined.

* * * * *

UNITED STATES PATENT AND TRADEMARK OFFICE
CERTIFICATE OF CORRECTION

PATENT NO. : 6,519,642 B1 Page 1 of 1
DATED : February 11, 2003
INVENTOR(S) : Gregory Olsen et al.

It is certified that error appears in the above-identified patent and that said Letters Patent is hereby corrected as shown below:

<u>Title page,</u>
Item [56], U.S. PATENT DOCUMENTS, please add the references cited:

| | | | |
|---|---|---|---|
| -- 5,970,472 * | 10/19/99 | Allsop et al. | 705/26 |
| 5,966,697 * | 10/12/99 | Fergerson et al. | 705/26 |
| 5,946,662 * | 8/31/99 | Ettl et al. | 705/8 |
| 5,940,807 * | 8/17/99 | Purcell | 705/26 |
| 5,893,076 * | 4/6/99 | Hafner et al. | 705/28 |
| 5,842,178 * | 11/24/98 | Giovannoli | 705/26 |
| 5,694,551 * | 12/2/97 | Doyle et al. | 395/226 |
| 5,440,479 * | 8/8/95 | Hutton | 364/401 |
| 4,799,156 * | 1/17/89 | Shavit et al. | 364/01 -- |

Signed and Sealed this

Twenty-fourth Day of June, 2003

JAMES E. ROGAN
*Director of the United States Patent and Trademark Office*